Oct. 24, 1967    E. K. KARLSSON ETAL    3,348,676
ROTARY CLEANING UNIT
Filed Aug. 5, 1964    2 Sheets-Sheet 1
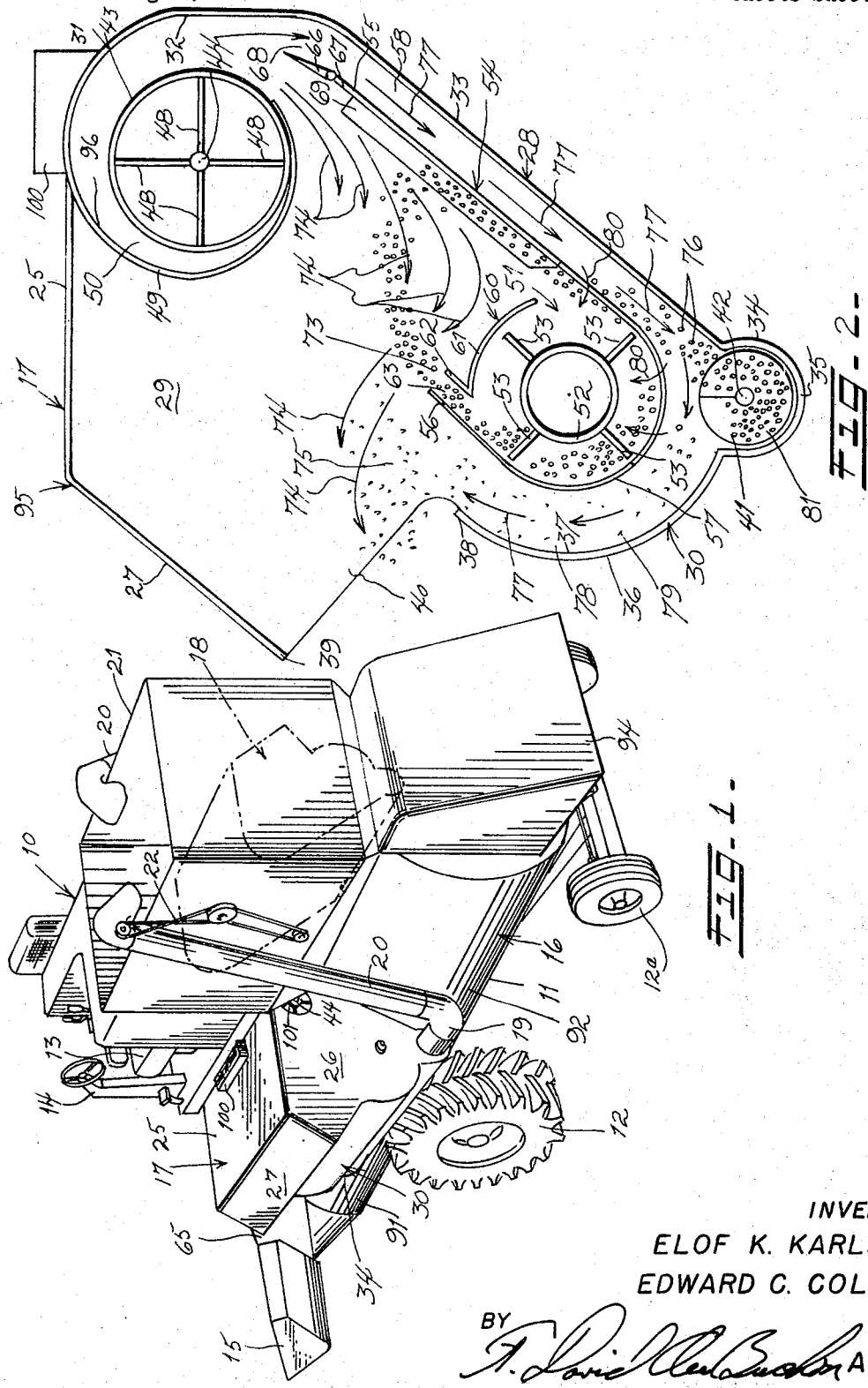
INVENTORS.
ELOF K. KARLSSON
EDWARD C. COLLINS
BY
ATT'Y

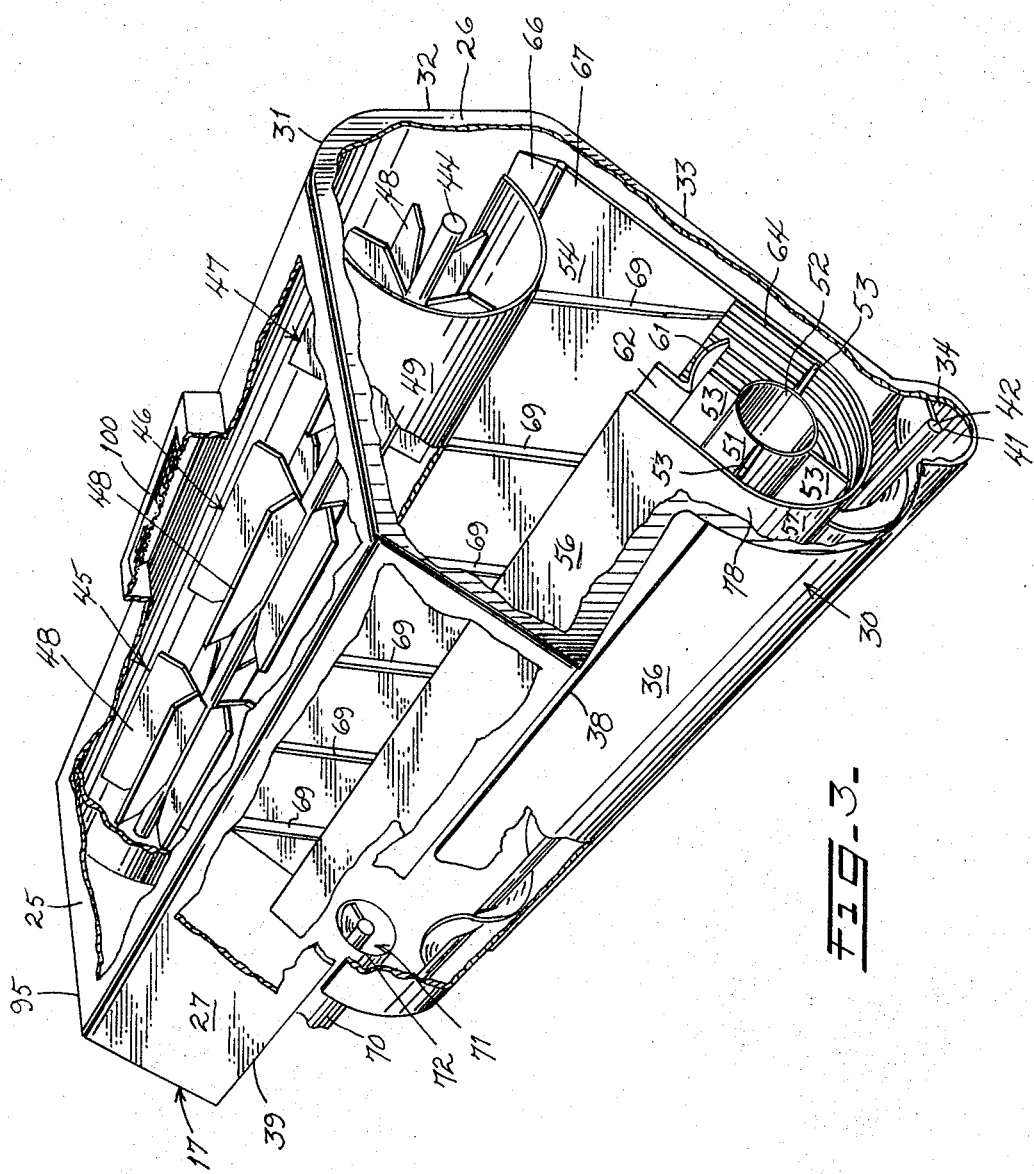

United States Patent Office 3,348,676
Patented Oct. 24, 1967

3,348,676
ROTARY CLEANING UNIT
Elof K. Karlsson, East Moline, and Edward C. Collins, Moline, Ill., assignors to International Harvester Company, Chicago, Ill., a corporation of Delaware
Filed Aug. 5, 1964, Ser. No. 387,593
2 Claims. (Cl. 209—22)

This invention relates to cleaning of grain and similar crops. More particularly the invention relates to cleaning crops and the like by the so-called axial flow type of process and apparatus.

Conventionally, grain and similar crops are harvested by a device which is known as a combine. A combine is a machine which cuts and threshes grain, then separates the grain from the large nongrain material such as straw, and thereafter, cleans the grain of the light trash such as chaff and other debris.

In a conventional combine, after the crop has been cut it is fed into a threshing mechanism and thereafter treated by straw walkers, chaffers, and the like, the main components of which involve reciprocating parts which vibrate, oscillate or shake back and forth to separate the grain from the various nongrain material. The mechanisms for effectuating efficient separation in accordance with conventional means are exceedingly elaborate, and, because the parts are constantly in motion by reason of the reciprocation required, they are subject to erosion by reason of wear.

Heretofore generally nonconventional and so-called axial flow type of equipment relies for its operation upon the use of components which are principally rotatably driven and upon the application of mechanical principles related to such rotary motion. Combine equipment employing rotatable components can be produced and maintained at less expense than those with reciprocative components. Yet, not until just recently, and for no reason apparent to experts in the art, has any appreciable attention been given to the so-called axial flow combines or to the making of improvements therein or the parts thereof.

In accordance with the instant invention and as a primary object thereof, there is provided an improved axial flow type process and apparatus for cleaning grain. The improved apparatus has eliminated all reciprocative components and has minimized moving parts substantially below that heretofore known or taught, while simultaneously providing excellent efficiency in grain cleaning.

Such results are achieved by employing the expedient of blowing air repeatedly through fractionally reduced portions of axially advancing grain to remove the debris and the like. To axially advance the grain a combination of rotary and immobile components are employed.

As a result, increased longevity over conventional apparatus is insured by reason of the reduction of vibrations and reduced erosion of parts which the instant invention achieves.

The foregoing and other objects, features and advantages of the present invention will become more apparent upon consideration of the following description and appended claims, when considered in conjunction with the accompanying drawings, wherein the same reference character or numeral refers to like or corresponding parts throughout the several views.

On the drawings:

FIG. 1 is a rear perspective view of a combine embodying the improved cleaning apparatus.

FIG. 2 is a rear end view of one embodiment of the improved grain cleaning apparatus.

FIG. 3 is a rear perspective view of said embodiment, with parts broken away for the purpose of illustration.

Referring now more particularly to the drawings, a self-propelled combine generally designated by the numeral 10 comprises an elongated body or frame 11 supporting a main housing 16. Front traction wheels 12 and rear dirigible wheels 12a, only one of which is shown in the drawing, carry the combine 10. The combine 10 is of the self-propelled type, however, this invention is equally applicable to pull-type combines which are adapted to be operatively connected by conventional means to a suitable prime mover, such as a tractor or the like.

The combine 10 is provided with a seat 13 for accommodation of an operator. Said combine 10 has manual controls 14 whereby the combine is operated.

A header 15 which extends transversely of the longitudinal axis of frame 11 is in communication with the combine 10 through the housing 65. The harvested crop is moved by the header 15 and conveyed rearwardly through the housing 65 which feeds it into the main housing 16. The combine's threshing and separating mechanisms are located in the housing 16 and after processing by these mechanisms straw and other debris is ejected from the housing 16 through a hood 94.

The separated grain is then carried forward by a pair of augers or other axial conveyors (not shown) to a pair of elongated housings 17 and 18. The housings 17 and 18 are carried on opposite sides of frame 11, the housing 18 being shown in dotted lines as it is hidden from direct view in FIG. 1. Housings 17 and 18 each encase a novel cleaning mechanism which is the subject of the instant invention.

The lower or shoe end 19 of an elevator housing 20 is connected to the discharge end of each of the housings 17 and 18. Said housings 20 enclose grain elevators which deliver cleaned grain from the cleaning mechanism housings 17 and 18 to a grain storage bin 21. Belt and sheave assemblies 22 connected by appropriate linkage to the prime mover means (not shown) operate the elevators in the housings 20 in any suitable or conventional fashion.

While the cleaning apparatus which embodies the invention, hereinafter particularly to be described, is shown mounted in housings carried on a combine, such carrier is employed only by way of illustration; and it is appreciated that said cleaning apparatus may be used with other machines, or by itself, as a stationary apparatus, if desired.

Attention is now invited to the housing 17 and the apparatus therein contained. Said apparatus is illustrated in detail in FIGS. 2 and 3. However, before proceeding with a detailed description thereof, definition of directions will be set forth to facilitate orientation and the further description. Referring to FIGURE 1 as a reference as used herein: the term "front" refers to the end of the housings closest to the header 15, the term "rear" refers to the end of the housings closest to the hood 94, the term "inner" refers to the side of the housings adjacent the main housing 16, and the term "outer" refers to the side of the housings remote from the main housing 16.

The housing 17, which has been previously in part described, is elongated with its longitudinal axis disposed parallel to the longitudinal axis of the frame or body 11. Top 25 is disposed in a substantially horizontal plane. The flange 27 with which said top 25 may be integral extends downwardly as it extends outwardly from said top 25. Housing flange 27 is elongated and its longitudinal axis is disposed parallel to the longitudinal axis of the housing top member 25. Together flange 27 and top plate 25 form a hood-like member over the bottom housing portion generally designated as 30.

Along the entire inner side of the top 25 the housing is curved downwardly as indicated at 31 in the drawings to provide a wind guide deflector. The curved portion 31 merges into a substantially integral upper vertical portion or section 32 of inner wall 28. Said upper vertical section 32 is limited to substantially the upper quarter of the housing member 17. From the lower end portion of the upper vertical inner wall section 32, the inner housing wall 28 slopes outwardly as it extends downwardly to provide an incline or inclined wall section 33 which is disposed at an angle of about 45° from the vertical.

The bottom part 30 of the housing 17 comprises an elongated trough or auger housing 34 which is arcuate in cross-section, as illustrated in FIGS. 2 and 3. The nadir 35 of the elongated trough 34 is disposed approximately midway between the inner and outer sides of the housing 17. The inner upper portion of the elongated trough 34 is coextensive with the lower end portion of the sloping wall 33, as illustrated in FIG. 2.

An elongated integral outer housing wall section 36 extends upwardly from the left upper portion of trough 34. Said housing section 36 bulges arcuately and outwardly and provides thereby an inwardly facing concavity 37. The lower portion 30 of the housing 17 terminates at the upper elongated edge 38 of the bulging section 36. Said edge 38 defines the lower limit of an opening or slot 40 into housing 17.

The elongated edge 38 is disposed inwardly of the elongated lower edge 39 of the flange 27. As a matter of fact, in the embodiment shown a substantial portion of the angular flange 27 is disposed outwardly of the bulging section 36 whereby an overhang of the upper portion 95 of housing 17 is formed with respect to the lower portion 30 of the housing 17. As illustrated in FIGS. 2 and 3, the edge 39 defines the upper limit of said opening or slot 40.

Opening 40 extends the length of housing 17 and provides the means through which chaff, debris and the like are ejected or eliminated from within housing 17.

An elongated clean grain transporting auger 41 is disposed in the trough 34, as illustrated in FIGS. 2 and 3. The auger 41 comprises an elongated shaft 42 the ends of which are journalled in the front and rear walls 29 and 26 respectfully, and is operably connected by suitable linkage to a prime mover whereby said auger 41 is rotated about its axis.

Cleaned grain will reach the trough 34 by means to be described hereinafter. The grain will then be carried by auger 41 to the elevator housing 20 for delivery to storage bin 21.

A fan member generally designated by the numeral 43 is disposed within the upper inner corner portion of the housing 17. The fan member comprises an elongated shaft 44, one end of which may be suitably journalled in the rear wall 26, as illustrated in FIG. 1. The shaft 44, preferably at its opposite end portion, is journalled and is operably connected to the prime mover means (not shown) by any suitable mechanism well known to those skilled in the art. The shaft 44 provides a fixed axis of rotation for a plurality of fan sections 45, 46 and 47, which are spaced from each other longitudinally of the shaft, as illustrated in FIG. 3. Each of the fan sections 45, 46 and 47 comprises a plurality of blades or fins 48, only some of which are numbered in FIG. 3.

An elongated air shield or baffle 49 which is arcuate in cross-section is secured within the housing 17. Baffle 49 extends partially about the fan member 43 with its concavity 96 facing inwardly. Fan member 43 is eccentrically disposed in the concavity 96 of said baffle or shield 49 in a manner that will cause a stream of air to flow from the fan against the curved air guide or deflector 31 and the upper portion of the vertical wall section 32, as illustrated in FIG. 2. An air intake port 100 is provided in the top 25 over fan section 46 and additional end ports 101 are provided in the end walls, as can be best seen in FIG. 1.

An elongated rotatable paddle member 51 extends longitudinally or axially of the housing 17. Said paddle member 51 is disposed within the lower portion 30 of the housing 17 about midway between bulging section 36 and incline 28. Paddle member 51 comprises a tube 52 which may be of large diameter and which is driven about a fixed axis of rotation which in the illustrated embodiment is substantially on the same center as the radius of curvature of the concavity 37 of the bulging section 36. A plurality of elongated radially extending paddle components or elevating fins or slats 53 have their inner ends secured to said tube 52.

An elongated channel member generally designated by numeral 54 is supported in fixed position within the housing 17. The longitudinal axis of said channel member 54 is parallel to the longitudinal axis of said housing. Any suitable means may be employed for effectuating the mounting of said channel member 54.

The channel member 54 is J-shaped in cross-section, as illustrated in FIG. 2. Said channel member 54 comprises a high wall 55, a low wall 56 spaced from the high wall, and a medial curved section 57, all integral with each other. The high wall and the low wall are substantially parallel to each other. The high wall 55 is also parallel to the incline 33 of the right wall section 28. However, said high wall 55 is spaced to the left from incline 33 to provide therebetween an elongated aisle 58 disposed below the fan 43 in operable alignment with the space 50, as will hereinafter become apparent.

The radius of curvature of the curved section 57 of the channel member 54 is only slightly larger than that of the radius of curvature of the cylinder generated by rotation of the paddle member 51; and said paddle member 51 is disposed within said channel member 54. Accordingly, as the paddle member 51 rotates the elevating slats or fins 53 will sweep the curved section 57 clean of material or carry material across the concavity of said curved section 57.

An elongated boss 60 is rigidly secured within the housing 17. The boss 60 comprises a curved portion 61 and a straight portion 62. The curved portion 61 is concentric with the cylinder generated by the rotating paddle member 51 and is spaced slightly therefrom, preferably equidistant between the parallel high and low walls 55 and 56. The disposition of said boss 60 preferably is such that the straight portion 62 of boss 60 is spaced from and parallel to the low wall 56 of the channel member 54 to provide an aisle 63 which will function in a manner to be hereinafter described.

A replaceable grid or screen or the like 64 extending longitudinally of the channel member 54 comprises partly the lower end portion of wall 55 and partly the upper end portion of the curved section 57. The grid or screen may be fabricated from a wire mesh or suitable spaced-apart wire strands. The grid or screen 64 is removably mounted by an suitable means in channel member 54 whereby the grid or screen may be easily removed for cleaning or replacement to vary the grid opening size.

Grid or screen 64 may extend the entire length of the channel member 54 or for such other length as is determined to give the best results in precluding contamination of cleaned grain in trough 34, as will become hereinafter apparent.

An elongated air fin or deflector 66 is rockably or pivotably secured by any suitable means to the top 67 of the high section 55 of the channel member 54. Said air deflector 66 extends substantially along the entire length of the channel member 54. The control of the deflector 66 is by suitable linkage (not shown) controllable by an operator.

By reason of the foregoing construction, the width of the opening 68 to the aisle 58 can be controlled. Accordingly, the volumes of air blown down and deflected from the aisle 58 can be controlled by said deflector 66.

There are provided a plurality of substantially parallel elongated angularly disposed transport fins or ribs 69. The ribs 69 are rigidly connected or secured to the inner surface of the high wall section 55 and extend upwardly and downwardly thereon transversely to the longitudinal axis thereof. As said ribs extend upwardly they slope forwardly, and accordingly, as they extend downwardly they extend rearwardly. By reason of the inclination of said ribs or transport fins 69, material such as grain falling or sliding downwardly along the inner surface of section 55 will be guided toward the rear of the cleaning device.

In the embodiment herein illustrated, there is disclosed a tube 70 and auger 72, seen in FIGURE 3, that are connected with the threshing and separating mechanisms of the combine and function to feed uncleaned crops through opening 71 into the cleaner housing 17.

While the cleaning apparatus herein disclosed is adapted for operation in conjunction with an axial flow type thresher and separator, it is appreciated of course that neither the details of the various processes nor the details of construction of the various devices used to treat the grain prior to cleaning is to be considered limiting upon the instant disclosure.

Having thus described the details of construction of the illustrated embodiment of the invention, a description of the operation thereof now ensues.

Once the uncleaned crop has been deposited in the forward end of the curved section 57, it is vigorously carried and tossed through the aisle 63 by the rotating fins or slats 53. In this connection, it is appreciated that the fins or slats 53 rotate in a clockwise direction with respect to FIG. 2.

The stream of air produced by fan 43 is divided and one branch follows a path represented by arrows 74 while the other branch flows through opening 68 down aisle 58 in a path represented by arrows 77.

The path of the air currents 74 will be referred to as the primary air path or path of primary current. By reference to FIG. 2 it is noted that the primary air current 74 passes through the uncleaned crop 73 tossed from aisle 63, and that it separates from crop 73 light material such as chaff, identified as 75, and carries it toward opening 40.

The grain in crop 73 is substantially more dense than the chaff 76, and, by reason of its inertia will fall upon the inner surface of high wall 55. As the grain which falls upon high wall 55 slides downwardly it is indexed rearwardly by ribs 69. A portion of the grain thus cleaned will fall through grid 64, the size of the mesh of which will be varied according to the physical dimensions of the crop being treated. Of course material that fails to pass through the grid will be carried back into the curved or paddle trough section 57 and again tossed through aisle 63 into the primary air path.

With respect to the grain 76 which has fallen through the grid or mesh 64, it will drop into the trough 34 as cleaned grain 81. From trough 34, the clean grain 81 will be conveyed rearwardly by auger 41 to be discharged into the elevator housing 20, and from there to the grain storage bin 21. However, before reaching trough 34, the falling grain 76 must cross aisle 58 through which a secondary air current represented by arrows 77 flows.

The secondary air current 77 finally cleans the grain by blowing chaff and other debris and the like from grain mass 76 upwardly through an aisle 78. Aisle 78 is formed between the short wall section 56 and the bulging section 36 of the housing 17. The mass of chaff and other debris blown from the falling grain 76 has been identified by the numeral 79. It merges with debris 75 with which it is blown out of the housing opening 40, as illustrated in FIG. 2 of the drawings.

What are referred to as tertiary air currents, the direction of which is shown in FIG. 2 by arrows identified by the numeral 80, find their way through the grid 64 from the aisle 58. The air currents 80 blow chaff and debris and the like from grain falling across the grid 64 into the path of the paddle wheel 51, as illustrated in FIG. 2. Thus the likelihood of nongrain material falling through grid or mesh 64 is minimized.

By reason of the adjustability of the deflector 66, which will control the volume of forced air comprising the primary and secondary currents and thereby indirectly the tertiary current, a high degree of refinement is possible in the technique of cleaning which an operator will learn through experience.

Inasmuch as the concentration of nongrain material is greatest at the front end of the mechanism, a portion of the grid or mesh 64 can be omitted and replaced by the solid fabric of the channel 54. Thereby, much of the non-grain material will have been removed before there is an opportunity for the grain to drop through mesh 64.

It is apparent that what has been described is a process for cleaning grain by continuously removing nongrain material from a grain mass while continuously removing from said mass cleaned portions thereof, and that the entire process occurs while the grain moves through a single cycle.

As many substitutions or changes could be made in the above described process and construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

We claim:
1. A device for removing nongrain material from a mixture thereof with grain comprising:
an elongated housing having a front wall, a rear wall and inner and outer side walls;
an elongated horizontally extending grain impeller disposed within said housing adapted to toss material upwardly therefrom;
an elongated inclined surface disposed in said housing spaced from one side wall thereof and in the path of the tossed material, said inclined surface and said one side wall providing an aisle therebetween;
a plurality of guides disposed on said inclined surface extending downwardly from said front to said rear wall;
a grid removably disposed in a lower portion of said inclined surface and providing means through which grain from the falling material can pass and over which the remainder of the material is returned to said impeller;
a clean grain trough disposed below said grid; and
means for directing a first air current on one side of said inclined surface into the tossed material and a second air current on the other side of said inclined surface through said aisle, such that said tossed material encounters said first current before falling onto the inclined surface and said grain that passes through said grid encounters said second air current while falling through said aisle whereby light nongrain material is carried away by said currents.
2. The invention as set forth in claim 1 wherein adjustable deflector means are provided for controlling the relative volume of said first and second air currents.

References Cited

UNITED STATES PATENTS

| | | | |
|---|---|---|---|
| 37,111 | 12/1862 | Rowe | 209—34 |
| 2,670,845 | 3/1954 | Busack | 209—26 |
| 3,270,879 | 9/1966 | Karlsson | 209—34 |

FRANK W. LUTTER, *Primary Examiner.*